UNITED STATES PATENT OFFICE.

WILLIAM A. KÖNEMAN, OF CHICAGO, ILLINOIS.

PROCESS OF TREATING VULCANIZED-RUBBER WASTE.

No. 823,054. Specification of Letters Patent. Patented June 12, 1906.

Application filed May 22, 1905. Renewed March 3, 1906. Serial No. 304,056.

*To all whom it may concern:*

Be it known that I, WILLIAM A. KÖNEMAN, a citizen of the United States, residing at Chicago, in the county of Cook and State of Illinois, have invented a new and useful Process of Treating Vulcanized-Rubber Waste, of which the following is a specification.

My invention relates to the process of recovering rubber from vulcanized-rubber waste, which includes separation of the fibrous material from the rubber by boiling the material in a finely-divided condition in the presence of chemicals for the purpose of dissolving the fiber and that of removing the sulfur or sulfur compounds and washing the product to cleanse it of the chemicals, particles of fiber, and other impurities.

My invention relates more particularly to that part of the process thus generally described which pertains to effecting devulcanization of the rubber in the material undergoing the rubber-recovering treatment.

To reconvert rubber scrap into a material approaching the original rubber or rubber compound, so that it may be used again in the manufacture of rubber goods, devulcanization is necessary. As the process is commonly practiced, however, devulcanization is only an apparent and not a true condition, since the contained sulfur is either not removed at all or is only acted upon and removed to a slight extent. The present practice may be divided into two methods of operation. In the so-called "acid system" of recovering or reclaiming rubber the material after being subjected to sulfuric-acid or hydrochloric-acid treatment for the removal of fiber is placed in a steam-devulcanizer, where it is subjected to steam heat and steam contact under pressure at a temperature exceeding 300° Fahrenheit. The steam does not dissolve any sulfur and cannot, therefore, remove it; but the high heat acting on the caoutchouc compound in a moist state causes a partial decomposition, and consequently partial destruction, of the caoutchouc by reducing a portion of it to a resinous condition, which enables adhesion of the mass in subsequent sheeting, molding, and other manipulation thereof. The material, however, has only little elasticity and but little tensible strength. That the so-called "devulcanization" is not properly devulcanization is proven by the fact that analysis shows an actually increased sulfur percentage when sulfuric acid was the acid used in the fiber-removing step of the process and from the further fact that subsequent curing or revulcanization may be effected without any addition of sulfur if the degree of resinification has been slight owing to short steam-heat exposure, though when much resinification has taken place the material requires the addition to it of some sulfur; but in either case the curing of goods made from it is effected in about one-third the time required for curing goods made from virgin rubber compounds. The other method employed involves the so-called "alkaline" treatment, wherein the stock is subjected to the action of an alkaline solution, also at a temperature exceeding 300° Fahrenheit, for a period of time varying from six to twenty-four hours. In this case only a slight removal of the free sulfur is effected, the combined sulfur not being attacked. The degree of resinification and consequent tackiness in this product is less. Hence the material has somewhat greater elasticity and tensile strength; but that the treatment has produced no actual devulcanization is proven by the fact that this product also cures or revulcanizes in sheet form of a thickness of about one-fourth of an inch in from four to six minutes, whereas a similar virgin compound requires thirty minutes or more for curing it.

True devulcanization must produce the removal of at least a considerable percentage of the combined as well as the free sulfur. Furthermore, if the resultant material shall have a value and qualities approximately equal to a similar compound made from virgin caoutchouc gum the true nature of the caoutchouc itself must not undergo change. In other words, resinification must be absolutely avoided, and this can only be accomplished by a solvent which will actually dissolve the sulfur at a non-destructive temperature. Such a solvent is that described in my application for Letters Patent, Serial No. 248,647, filed March 6, 1905, which is based on my discovery that the simple halogen salts when added to a mineral acid form a solvent for both fiber and sulfur, the final product being fully equal to the original compound from which the goods treated were manufactured, both in degree of elasticity and that of tensile strength, and the treatment of the material and the length of time given for revulcanization must be the same as employed with similar compounds made from new caoutchouc. My further experimental work has shown that the same effect can be secured with sulfuric acid as a base when acids of the halogen elements are added to the sulfuric acid. In practice a mixture of sulfuric and hydrochloric acid is the most commercial. In this case the hydrochloric acid should be present in a quantity sufficient to act energetically. I find that sulfuric acid of 60° Baumé, to which a somewhat larger amount of hydrochloric acid is added and the whole diluted with about eight volumes of water, gives excellent results when boot and shoe or rubber-tire scrap is treated. Whether the hydrochloric acid is sufficient is readily determinable by examining the material under treatment from time to time. Sulfuric acid alone turns the stock black, and it remains dense and strong and is not devulcanized. Hydrochloric acid alone bleaches the stock; but it also remains dense and strong and is not devulcanized, while its action in removing the fiber alone is so slow as to render it an uncommercial proceeding, fully twenty-four hours of constant boiling being required, resulting in the loss of a large quantity of the acid, which is the reason for its non employment. When, however, hydrochloric acid is present in sufficient quantity with sulfuric acid, the fiber is corroded in a few minutes and is disintegrated in about thirty minutes. If the stock has been passed through a screen of three-eighths-inch mesh, the stock under treatment becomes white or light yellow, and as the sulfur is dissolved the stock swells and becomes porous and very tender, offering but little resistance to stretching, yet showing a true unvulcanized gum condition. The best test I have found for determining when the solvents have done their work properly is to introduce a little red-lead stock. When such stock turns gray or to a pale-yellow color, which takes about two hours, devulcanization is practically complete, and the physical condition of the stock is such that compounded matter like lime and lead, if they have not been dissolved, drop out or can readily be removed by passing the material while wet through squeezing-rolls. It is advisable that this acid-treated stock be subsequently boiled in an alkaline solution, which, however, will turn it black again, so that if a product of a light-gray color is desired in its natural state the operation ends (after washing in an alkaline water) with the one acid-boiling treatment, which is a simple boiling operation at 212° Fahrenheit. If the material is kept sufficiently wet, this temperature can be raised considerably to hasten the already rapid operation with safety. In this acid treatment, as in my aforesaid salted acid treatment, the addition of oxidizing substances which set free chlorin gas would be detrimental and destructive of the hydrochloric acid, besides causing the operation to be very obnoxious and dangerous, owing to the poisonous nature of free chlorin gas. My mixture of acids without oxidizing agents does not give objectionable fumes or vapors in boiling so long as a reasonable degree of water dilution is maintained.

What I claim as new, and desire to secure by Letters Patent, is—

1. In the chemical treatment, for the purpose set forth, of vulcanized rubber or rubber compounds, the process of devulcanizing the same, which consists in boiling the material in a finely-divided condition, in an aqueous compound acid solution, practically free from oxidizing ingredients, of sulfuric acid, as the base, and an acid of the halogen elements of chlorin, bromin or iodin.

2. The process of treating vulcanized rubber or rubber compounds, for the purpose set forth, which consists in boiling the material, in a finely-divided condition, in an aqueous solution, practically free from oxidizing ingredients, of sulfuric acid and hydrochloric acid, and washing and drying the product.

3. The process of treating vulcanized rubber or rubber compounds, for the purpose set forth, which consists in boiling the material, in a finely-divided condition, in an aqueous compound acid solution, practically free from oxidizing ingredients, of sulfuric acid, as the base, and an acid of the halogen elements of chlorin, bromin or iodin, boiling the product in an alkaline solution, and washing and drying said product.

WILLIAM A. KÖNEMAN.

In presence of—
L. HEISLAR,
J. H. LANDES.